Figure 1:
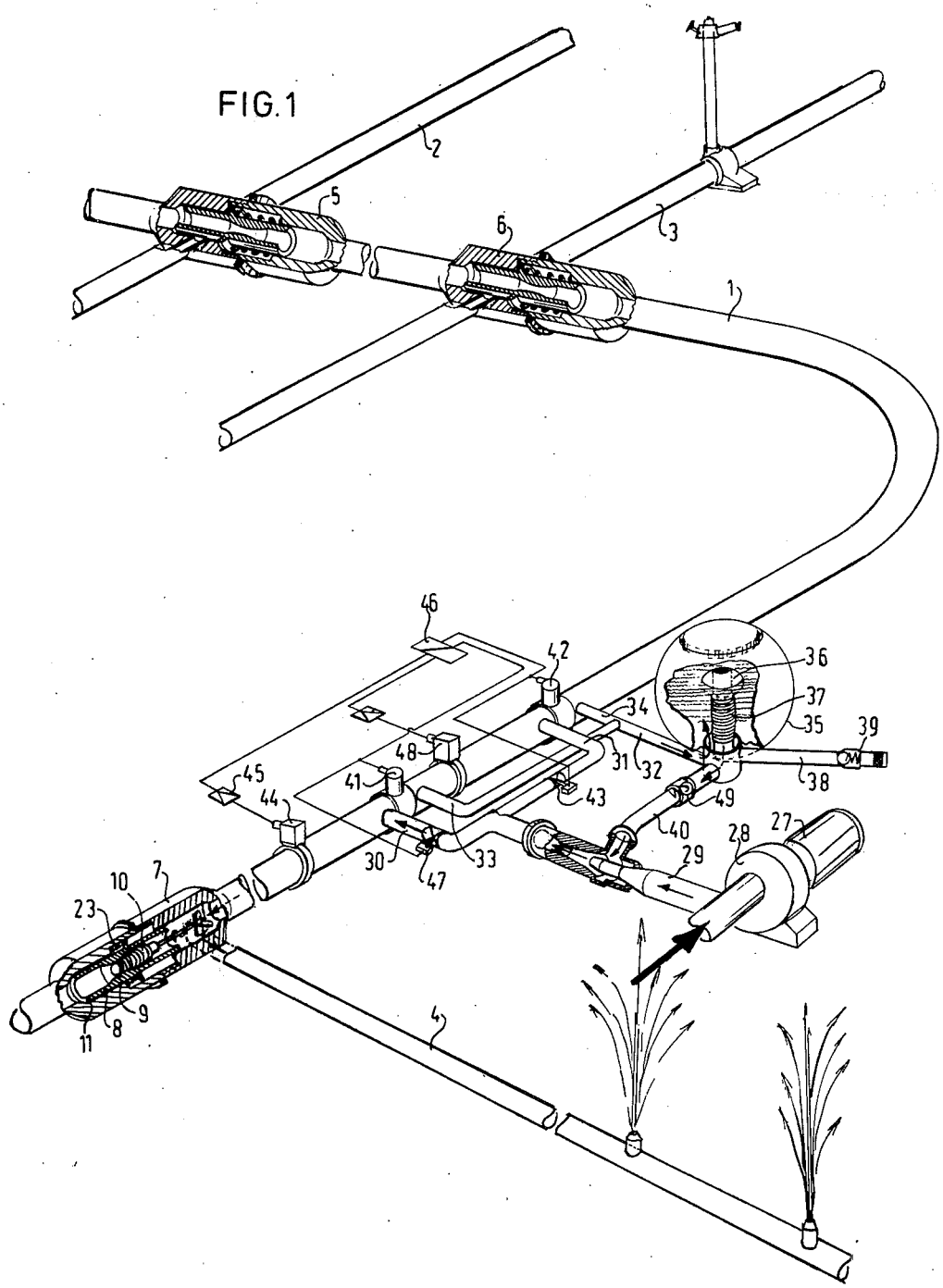

United States Patent [19]
Van Haaften

[11] 4,150,685

[45] Apr. 24, 1979

[54] LIQUID DISTRIBUTION DEVICE

[76] Inventor: Henry M. T. Van Haaften, Aquamarijnstraat 793, Groningen, Netherlands

[21] Appl. No.: 809,658

[22] Filed: Jun. 24, 1977

[51] Int. Cl.$^2$ ............................................... B05B 1/00
[52] U.S. Cl. .................................. 137/119; 137/624.2
[58] Field of Search ............... 137/119, 624.18, 624.2; 302/2 R; 138/93; 15/104.06

[56] References Cited

U.S. PATENT DOCUMENTS 3,512,554  5/1970  Childers .......................... 137/268 X

FOREIGN PATENT DOCUMENTS 2088763  1/1972  France ........................................ 239/66

Primary Examiner—Alan Cohan
Attorney, Agent, or Firm—John P. Snyder

[57] ABSTRACT

A distribution device, particularly for water, comprising a main conduit communicating with outlet members each normally closed by a respective valve and a body adapted to move through the conduit for sequentially opening each said valve for a period of time depending upon the retention time of the body at a valve, wherein said body includes means for the optional adjustment of said period of time of opening for each valve, and said valve comprising a control-member extending partly into the path of the body.

22 Claims, 5 Drawing Figures

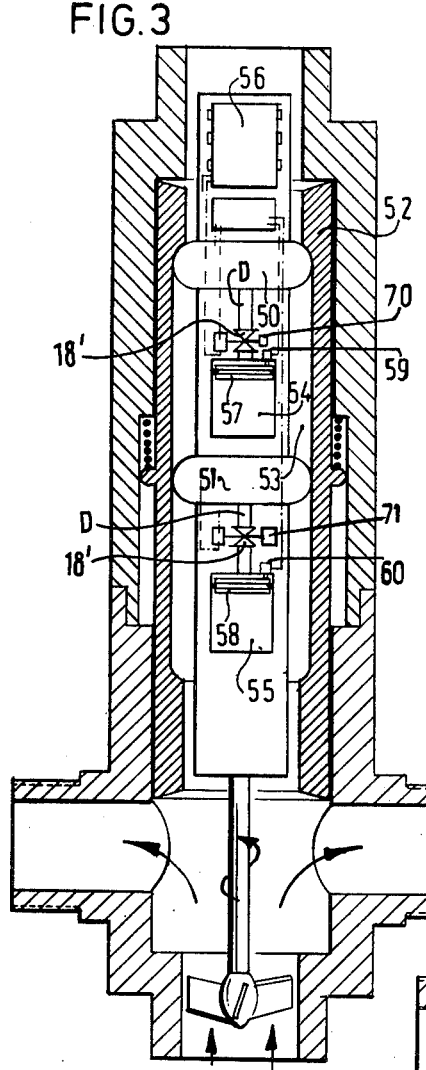
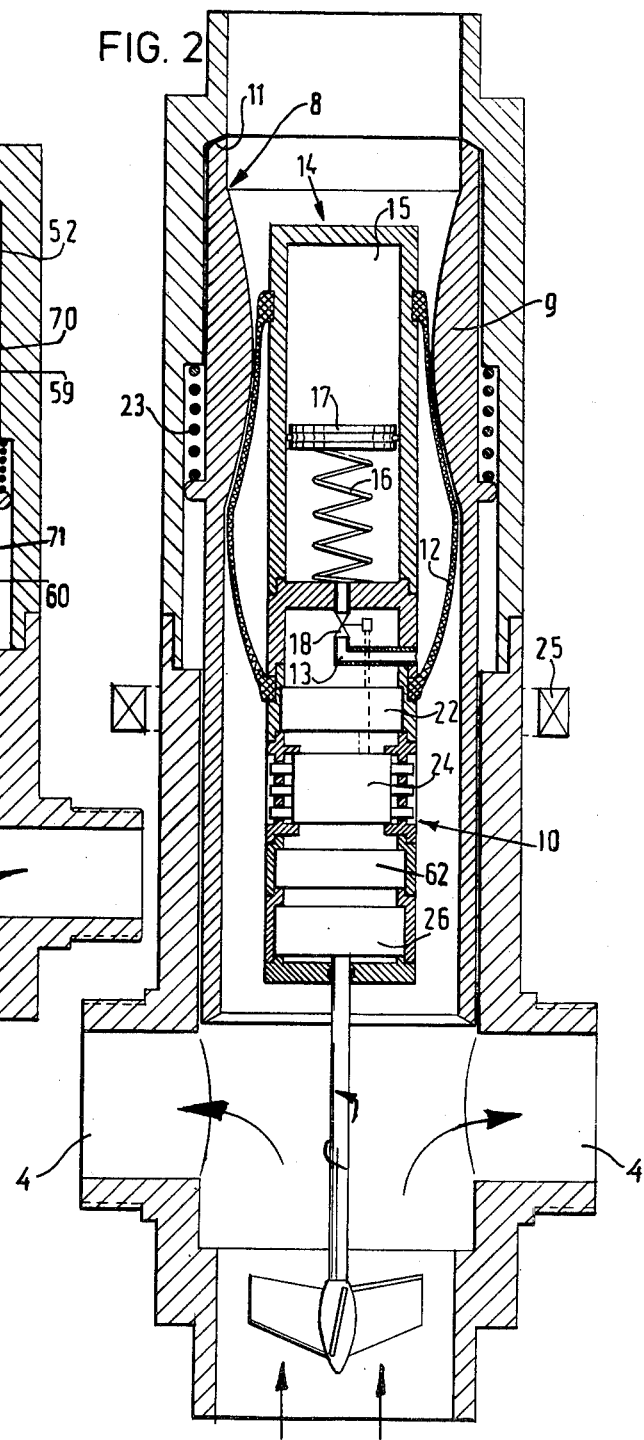

LIQUID DISTRIBUTION DEVICE

The invention relates to a distribution device, particularly for water, comprising a main conduit communicating with outlet members adapted to be individually closed by a valve and a body adapted to move through the conduit for opening and closing said valve for a period of time depending upon the retention time of the body at a valve. Such a distribution device is disclosed in French Patent Specification No. 2,088,763 as a raining system.

Opening and closing of successive valves in the conduit is performed by causing a ball to circulate in said conduit, in which the period of time for which a valve remains open and the period of time elapsing between the actuation of successive valves are dependent upon the circulation speed of the ball in the conduit. A disadvantage of the known device is that each valve is opened for the same period of time. When the device is employed as a raining system, this means that each area to be sprinkled receives the same quantity of water. Particularly in the case of an extensive distribution mains this is not acceptable, since frequently different kinds of crop have to be rained upon, which each require a different quantity of water. Therefore, such systems cannot be used especially in arid areas, where only a small quantity of water is available.

The invention has for its object to obviate said disadvantage. According to the invention this is achieved by providing the body with means for the optional adjustment of each valve for a time interval. In this way the quantity of water to be delivered can be controlled for each outlet without the need for using additional ducts, control-means and the like. In one embodiment a valve may have an actuating member extending partly into the path of the body and the body may have at least one radially expendable member, the time interval of the expanded state being adjustable. The expandable member may be formed by a flexible envelope, which expands under the action of a pressurized medium. The pressurized medium can be supplied through a control valve included in a communication duct with a hydroaccumulator.

The control of the control valve may be achieved by the action of an electro-magnetic field. The body may comprise a programmable memory, in which the time interval of the expansion of the member is stored. The development of the magnetic field is started by a signal from a signal generator disposed near a control valve. Alternatively, the development of the magnetic field may be started by a signal from a signal generator arranged in the body. The body may furthermore comprise an address counter whose contents are incremented by one at each outlet member, whilst the memory location is selected and read on the basis of the state of the address counter.

The conveying conduit is preferably an annular conduit in which the body is propagated by the pressure of the liquid. A liquid reservoir may communicate with the ring conduit for temporarily storing the water pushed on by the body, the water being withdrawn therefrom at the beginning of a next cycle for distribution in the mains. For this purpose the fluid reservoir is connected with the ring conduit near the inlet of pressurized fluid. This inlet can supply fluid to the ring conduit each time at one of two relative spaced places. The fluid reservoir is also connected at two relatively spaced places with the ring conduit. The withdrawal of the liquid from the reservoir for distribution in the mains is enabled by the connection of the fluid reservoir with the inlet duct. In order to ensure the desired flow of liquid the ring conduit includes further valves upstream of the water inlet places, viewed in the direction of the conveyance of the liquid, which are controlled by the moving body. The further valves are actuated electromagnetically under the action of a switch controlled by the moving body and being disposed on the outer side of the ring conduit. The outlet members are preferably formed by distribution ducts having spray nozzles. The electric source of the body may be formed by a battery and/or a generator driven by the water pressure in the body.

Figure 5:
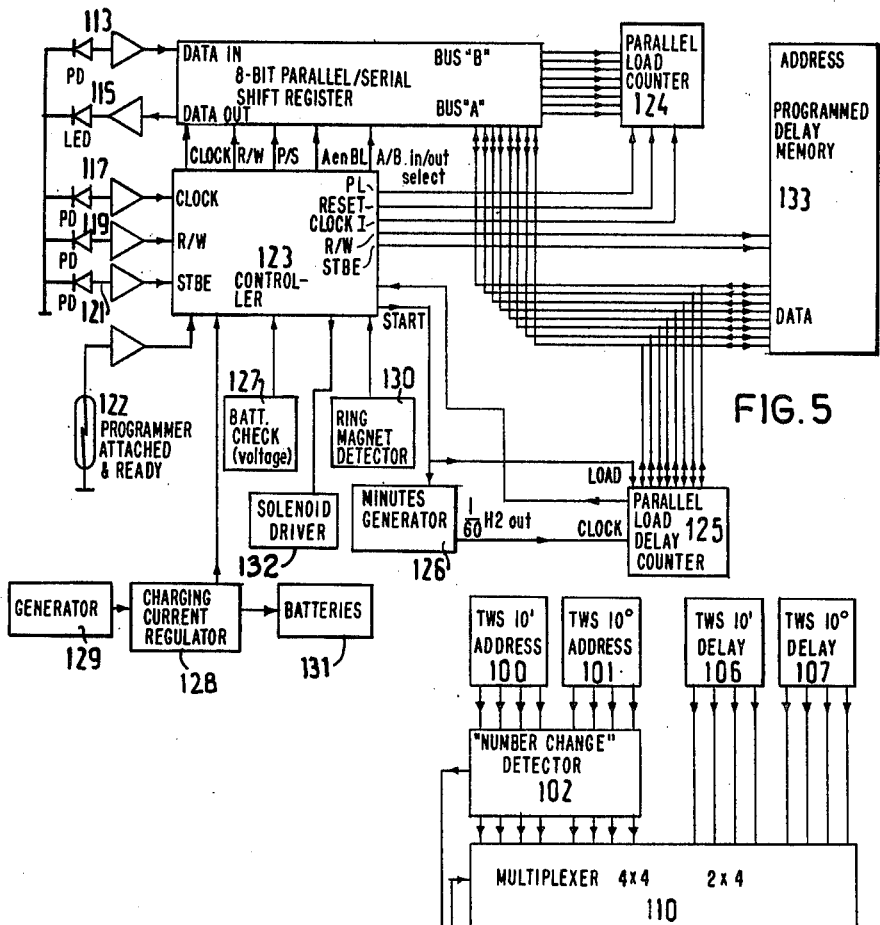
Figure 4:
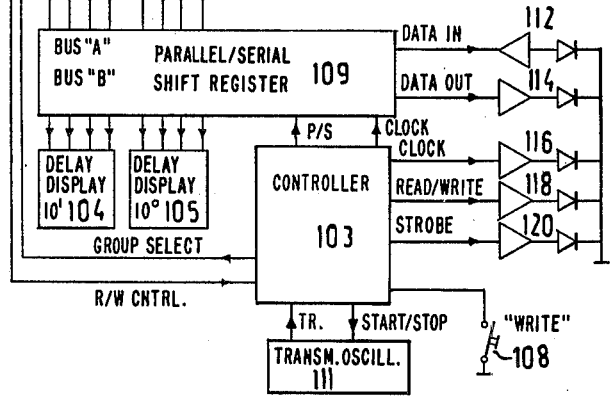

The invention will be described more fully with reference to the drawing showing one embodiment. In the drawing:

FIG. 1 is a perspective view of part of a ring conduit mains with distribution ducts communicating herewith, FIG. 2 is a schematic sectional view of the ring conduit and the body moving therein at the area of a valve, FIG. 3 shows a variant of FIG. 2, FIG. 4 is a block diagram of part of the control-circuitry and of means for programming the control-memory and FIG. 5 is a block diagram of the control-circuitry.

The ring conduit 1 communicates with a plurality of distribution ducts 2, 3 and 4. The path from the ring conduit to the distribution ducts can be blocked by means of the valves 5, 6 and 7. The valves are formed by a valve body, for example 8, adapted to be slid in the ring conduit across the outlet opening to the distribution duct.

The valve body 8 has an inwardly directed, annular bulging portion 9 (FIG. 2). When a plug-like body 10 approaches, the valve body 8 is moved into the opened state, the state in FIG. 2, since the plug body 10 has a portion of larger diameter such that the plug body cannot move past the bulging part 9. Pushed on by the water pressure, the valve body 8 is thus moved up to the stop 11. The portion of larger diameter of the plug body 10 is formed by an expandable, flexible envelope 12. The envelope 12 expands radially because the duct 13 establishes an open communication with a hydroaccumulator 14. The hydro-accumulator 14 comprises a reservoir of a medium pressurized by a piston 17 biassed by the spring 16. The duct 13 includes a control valve 18. The bias pressure on the piston 17 is chosen so that the envelope 12 constantly engages the inner side of the duct or the valve body. The pushing power of the water in the conduit is such that at a constriction of the conduit the envelope is compressed and the medium is pressed back towards the accumulator provided, of course, the control valve 18 is open.

The control valve 18 can be closed by means of an electric signal. This signal emanates from an electromagnetic signal generator 25 disposed near a valve 5, 6 or 7. The valve 18 is actuated by means of the electromagnetic coil 22. When the magnetic field disappears at the termination of the energization of the coil 22, the plug body 10 is moved on by the water pressure, since the envelope can again be compressed, so that the medium flows back through the duct 13. Under the action of the spring 23 the valve body 8 moves down in FIG. 2 and the duct 4 is blocked. In this way the identical valves 5 and 6 are actuated in order of succession so that each time one of the distribution ducts receives water whilst the other ducts are closed. The plug body 10 includes a memory 24 having an address counter. The memory may have a plurality of locations, for example, 100, in which a defined, coded time interval is stored. When the signal generator formed by a magnet ring 25 is passed by, it supplies the starting signal for building up the magnetic field, whilst at the same time the address counter is incremented by one. Moreover, a time generator is started, which counts the encoded time interval of the memory location concerned.

At the end of said interval the energization of the coil 22 is terminated and the plug body 10 can continue its movement through the ring conduit. The plug body may be fed from batteries 62 or, as the case may be, from a generator 26 shown schematically, which is rotated by the stream of water. The memory may be programmed from the outer side of the plug body 10 by actuating appropriate control-members. In this way a time interval of the opened state can be selected for each memory location or valve.

FIG. 3 shows an embodiment in which two expandable members are provided instead of one. Instead of one expandable body there are provided two annular envelopes 50 and 51, which engage, in the expanded state, a stop formed by the edge 52 of the annular recess 53 of the valve body. The envelopes 50 and 51 communicate through the ducts D with the hydro-accumulators 54 and 55. Each duct can be closed by means of a control valve 18'. The valve is actuated electro-magnetically by a signal generator 56 in the memory. The signal generator 56 supplies a signal when the pistons 57 and 58 in the hydro-accumulators perform a predetermined stroke. This occurs when the envelopes 50 and 51 are allowed to expand strongly when a distribution duct is passed by. The pistons 57 and 58 actuate a relay 59 and 60 respectively. When the two relays are energized, the signal generator in the memory 56 applies a pulse to the coils 70 and 71 so that the two control valves are simultaneously closed. After the termination of the retention time a second pulse is supplied for opening the control valves.

It should be noted that it is also possible to program a retention time zero in the memory. In this case, when the magnet ring 25 is passed by, no signal is applied to the valve control. The plug body moves past the valve without causing a distribution.

The water is supplied, for example, through the supply duct 29 by means of a pump 28 driven by a motor 27. The supply duct splits up into two branches 30 and 31, which can supply water to the ring conduit 1 at relatively spaced places. The ring conduit furthermore communicates with an outlet duct 32, which can withdraw water from the ring conduit 1 by means of the branch lines 33 and 34 at two places. The duct 32 is connected with the reservoir 35 including a floating body 36, which is connected with bellows 37. The bellows with the floating body operate as discharge valves for an excess quantity of water and air. During its travel through the ring conduit the plug body pushes the water in front of it and the water is temporarily stored in the reservoir 35. When the reservoir is filled, the water can be conducted away through the duct 38, which can be closed by a non-return valve 39. Through the duct 40 the outlet side of the reservoir communicates with the supply duct 29. At the connecting points of the supply ducts 30 and 31 further valves 41 and 42 are provided. The ducts 30 and 31 can be separated by the magnetic valves 43 and 47. Viewed in the direction of travel of the plug body, the switch 44 is disposed in front of the supply duct 30, which switch can actuate through a coil 45 the relay 46, which can actuate the valves 41 and 42 as well as a valve 47 in the duct 30 and the valve 43. In the position of the plug body 10 (in the valve 7) shown in FIG. 1 the valve 41 is closed and the valve 42 is opened. The valve 47 is opened and the valve 43 is closed. This means that during the travel of the plug body through the water supplied by the duct 30 into the ring conduit the propelled water is conveyed through the outlet ducts 33 and 34 towards the reservoir 35. When the switch 48 is passed by, relay 46 is actuated as a result of which the valve 41 is opened and the valve 42 is closed. Moreover, the valve 43 is opened and the valve 47 is closed. The supplied water flows on through the duct 31 so that the plug body is conveyed on and the water propelled through the ring conduit is conveyed through the duct 33 towards the reservoir 35. The plug body continuing its movement then passed by the switch 44, which actuates the relay 46 through the coil 45 so that the valve 41 is closed and the valve 42 is opened. Moreover, the valve 47 opens and the valve 43 closes so that the supplied water is again supplied through the duct 30 to the ring conduit 1 and the propelled water is supplied through the ducts 33 and 34 to the reservoir 35. Subsequently the plug body arrives at the valve 7, which is opened, whereas the further valves in the ring conduit 1 remain closed. The pumped-up water is thus supplied to the distribution duct 4.

The combination programming-unit/delay-unit (see FIGS. 4 and 5) constitutes a system by which some hundred delay times can be stored in a digital memory for subsequent use in a fixed order of succession and in dependence upon given conditions. The delay periods may be freely chosen between zero and 99 minutes.

The programming unit fed from the electric mains comprises the circuits by which the hundred memory addresses can be charged, an accumulator charging device for the delay unit and circuits for the data transmission from and towards the delay unit. The delay unit is fed from a built-in accumulator and comprises apart from the delay unit proper with its control-circuits a Charging Current Regulator 128, a Battery Check 127, one or two Solenoid Drivers 132 (depending upon the design), a Ring Magnet Position Detector 130, a Programmed Delay Memory 133 for at the most 100 delay digits, data-transmission- and control-circuits.

Programming Unit (FIG. 4)

By means of the thumb wheel switches Address 100 and 101 the memory location of the delay unit is selected, whose contents have to be become known. When the thumb wheel switches are standing still for ½ to 1 second, the Number Change Detector 102 applies a trigger signal to the Controller 103 in order to start a read cycle, by which through the transmission circuits a memory address is serially applied to the Delay Unit (FIG. 5), which responds by transmitting back the memory contents (i.e. delay time). This information appears on the Delay Displays 104 and 105, whilst the information in the memory remains the same. If it is desired to change the information at the selected memory location the desired delay time is set on the thumb wheel switches Delay 106 and 107 and the Write knob 108 is depressed. Thus the information at the relevant memory location is replaced by the new selected delay time. Data transmission takes place through a parallel-series/series-parallel shift register 109 in blocks of 8 bits.

For the input from the thumb wheel switches use is made of a Multiplexer 110, which converts the total of 16 bits (4×4) into 2×4 bits. The transmission clock signal is indirectly derived from the Transmission Oscillator 111. The entire unit is governed by the Controller 103.

The coupling of the Programming Unit (FIG. 4) and the Delay Unit (FIG. 5) is established by means of a LED photo-diode pairs 112, 113, 114, 115, 116, 117, 118, 119 and 120, 121 with the exception of the charging circuit, which is coupled for direct current.

Delay Unit (FIG. 5)

The Delay Unit has two operating modes:

1. a programming mode comprising the input or control of memory information with the aid of the programming unit;
2. a delay mode comprising the generation of control-signals to solenoid drivers in dependence upon programmed delay times, the position of the ring magnet, the accumulator voltage and the like.

For programming the delay unit (FIG. 5) is mechanically coupled with the programming unit (FIG. 4). If the coupling is correct, this is detected in the delay unit by means of "programmer attached and ready" 122, upon which the programming mode is automatically selected.

The data transmission from and to the delay unit is regulated from the programming unit by means of "clock read/write strobe". The controller 123 interprets the incoming information and supplies internal control-signals. In the delay mode the desired delay time is selected in that the parallel load counter 124, whose state is incremented by 1 starting at zero, at every instruction "select next delay time" (address inc. clock). At each address the parallel load delay counter 125 is loaded with the contents of said address which are decreased by 1 a minute after a start instruction via the minutes generator 126. When the state zero is attained, the delay time has elapsed. (zero count).

Battery check 127 supplies to the controller 123 information about the loading state of the accumulator 131 and the charging current regulator 128 indicates whether the generator 129 supplies suffucient current and the ring magnet detector 130 provides a position indication of the ring magnet. The solenoid driver 132 controls the electro-mechanical converters.

What I claim is:

1. A distribution device for a liquid, particularly water, comprising a main conduit communicating with a plurality of outlet members each of which has a normally closed valve associated therewith, and a body adapted to move through the main conduit for opening said valves in sequence, each for a predetermined period of time depending upon the retention time of the body at each valve, characterized in that the body includes means for the optional adjustment of said retention time of the body at each valve.

2. A distribution device as claimed in claim 1, characterized in that each valve comprises a control-member extending partly into the path of the body and in that said body comprises at least one radially expandable member, the period of time during which said member is in the expanded state being adjustable.

3. A distribution device as claimed in claim 2, characterized in that the expandable member is formed by a flexible envelope which expands by the supply of a pressurized medium.

4. A distribution device as claimed in claim 3 including a hydroaccumulator providing said supply of the pressurized medium, a duct communicating said hydroaccumulator with the interior of said envelope and a control valve included in said duct.

5. A distribution device as claimed in claim 4, characterized in that the control valve is actuated under the action of an electro-magnetic field.

6. A distribution device as claimed in claim 5, characterized in that the body comprises a programmable memory in which the period of time for which the expansion of the member is maintained is stored.

7. A distribution device as claimed in claim 6, characterized in that the development of the magnetic field is started by a signal produced by a signal generator disposed near a valve.

8. A distribution device as claimed in claim 6, characterized in that the development of the magnetic field is started by a signal produced by a signal generator arranged in the body.

9. A distribution device as claimed in claim 1, characterized in that the main conduit is a ring conduit.

10. A distribution device as claimed in claim 1, characterized in that the body is moved on by fluid pressure.

11. A distribution device as claimed in claim 9, characterized in that a fluid reservoir communicates with the ring conduit.

12. A distribution device as claimed in claim 11, characterized in that the fluid reservoir is connected near a supply duct supplying pressurized liquid to the ring conduit.

13. A distribution device as claimed in claim 12, characterized in that the supply duct can supply liquid to the ring conduit each time at one of two relatively spaced places.

14. A distribution device as claimed in claim 11, characterized in that the fluid reservoir communicates with the ring conduit at two relatively spaced places.

15. A distribution device as claimed in claim 11, characterized in that the fluid reservoir also communicates with the supply duct.

16. A distribution device as claimed in claim 13, characterized in that the ring conduit includes further valves located in front of the inlet places, viewed in the direction of the fluid flow and adapted to be closed.

17. A distribution device as claimed in claim 16, characterized in that the further valves are actuated by the moving body.

18. A distribution device as claimed in claim 17, characterized in that the further valves are actuated electro-magnetically under the action of a switch actuated by the moving body and located externally of the ring conduit.

19. A distribution device as claimed in claim 1, characterized in that the outlet members are formed by distribution ducts provided with spraying nozzles.

20. A distribution device as claimed in claim 1, characterized in that the body is electrically fed by batteries included in said body.

21. A distribution device as claimed in claim 1, characterized in that the body is electrically fed by a generator included in the body and driven by the water pressure.

22. A distribution device as claimed in claim 6, characterized in that the body includes an address counter whose state is incremented by 1 at every outlet member and in that the memory location is selected and read on the basis of the state of the address counter.

* * * * *